UNITED STATES PATENT OFFICE.

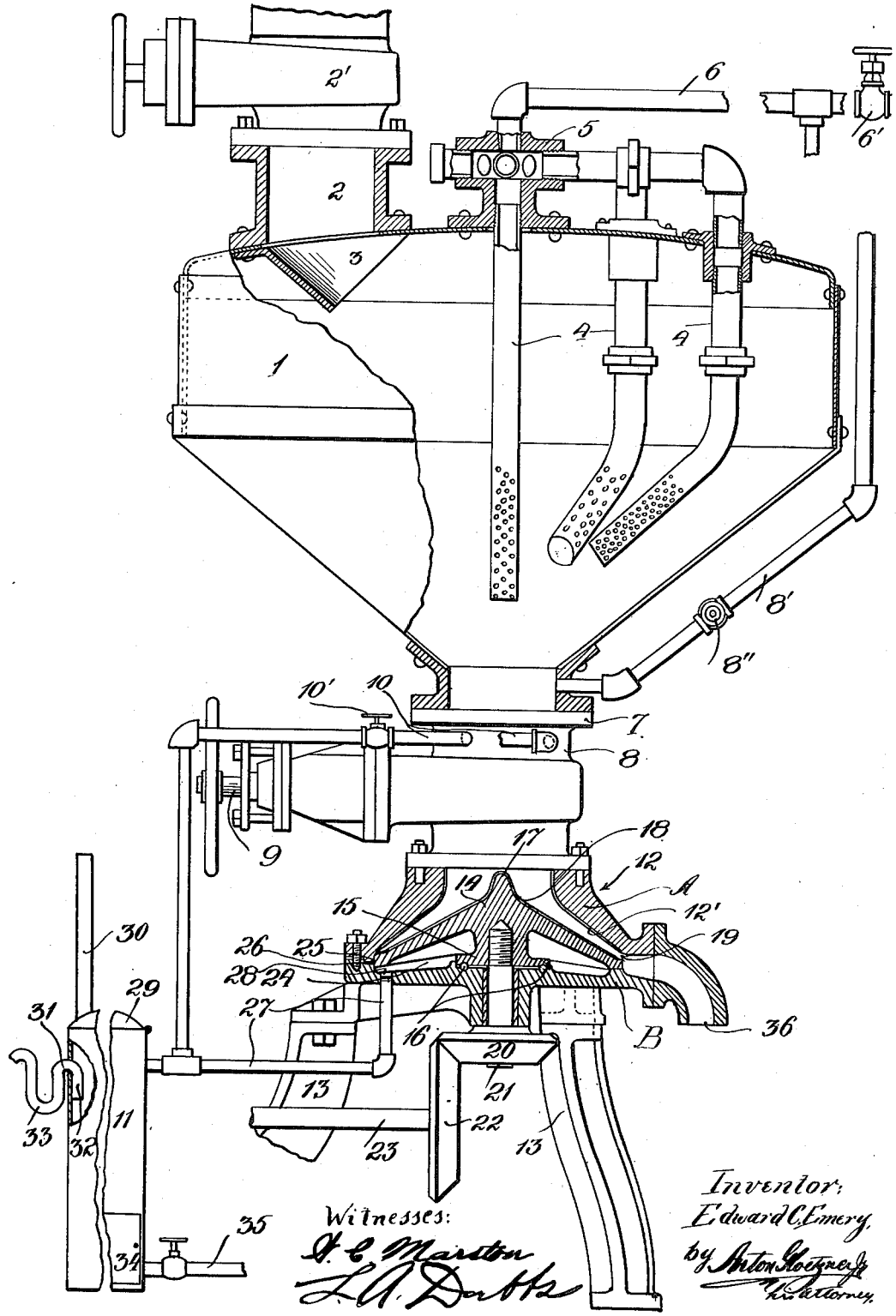

EDWARD C. EMERY, OF LOS ANGELES, CALIFORNIA.

APPARATUS FOR TREATING WASTE.

1,030,169.  Specification of Letters Patent.  Patented June 18, 1912.

Application filed December 13, 1911. Serial No. 665,561.

*To all whom it may concern:*

Be it known that I, EDWARD C. EMERY, a citizen of the United States, residing at Los Angeles, in the county of Los Angeles and State of California, have invented a certain new and useful Apparatus for Treating Waste, of which the following is a specification.

My invention relates to an apparatus for treating animal and vegetable refuse, and in general, kitchen and table waste of any kind.

What is commonly considered worthless and useless garbage, is in reality food stuff of nourishing quality, particularly for poultry and hogs, but under present practices, such offal is thrown into receptacles with other refuse, and there allowed to undergo various stages of fermentation, which is especially favorable for the engenderment and propagation of the dangerous toxic germs. The diseases of fowl and swine, in particular, are largely, if not solely, attributable to this character of decomposed or partially putrified waste, so also a great many diseases caused in human beings by the consumption of flesh contaminated with infectious matter.

This invention, therefore, is directed, first, toward the preservation of the nutritious elements of the waste, including the organic salts; second, toward the sterilization of these waste products; third, toward the obtainment of purified food stuff, in a homogeneous mass, free from unassimilable matter, and containing the essentials of nutritive aliments, such as animal and vegetal proteids, and finally, toward the recovery of the valuable animal and vegetal oils, which are ordinarily cast away.

With these and other objects in view, this invention, consists of the features, details of construction and combination of parts described in connection with the accompanying drawings, and then more particularly pointed out in the claims.

The drawing illustrates a sectional elevation showing the vat and the grinder.

The apparatus consists of a vat 1, into which the waste material is delivered through an inlet 2, provided with a valve 2', a deflector 3, being stationed in proximity to said inlet to cause the material to be deposited approximately centrally of said vat.
Within said chamber or vat, are disposed a plurality of perforated pipes 4, which are connected to a manifold 5, riveted to the top of said vat, and to which manifold steam is supplied through a pipe 6, provided with a cut-off valve 6'. The vat is bolted to the flanges 7, of a casing 8, containing a gate valve 9. Leading from said casing 8, at a point above said gate valve, are a plurality of pipes 10, furnished with a valve 10', which pipes serve to convey the liquids in the garbage to a settling and collecting tank 11, to be more fully described hereinafter. Connected with said main steam pipe 6, and with said casing 8, is a pipe 8', which, when the valve 8'', thereon is opened, admits steam to the casing to loosen up the material, which by reason of its weight might become congested and choke the passage way of the casing 8. The valve casing 8, is mounted on and fastened to a housing 12, composed of two sections, A and B, secured together at their peripheral edges, and whose interior configuration is substantially conical. The underside of the section A, of the housing is provided with a plurality of acuminate ribs 12', while the section B, which is supported by suitable legs or standards 13, forms a bearing for a vaned cone 14, the base 15, of which is carried by balls 16, to reduce the friction incident to the high speed at which it is necessary to revolve said cone. The apex 17, of the cone, is substantially central of the housing 12, and functions as a distributer for the material falling from the vat through the gate valve 9. The vanes 18, of said cone 14, coöperate with the acuminate ribs 12', of the section A, in grinding the mass as it gravitates from above, and in centrifugally discharging the ground mass through the opening 19, in one side of the housing. Said cone is revolved by a bevel gear 20, mounted on a shaft 21, which is screwed in said cone, and a bevel gear 22, meshing with said bevel gear 20, the driving gear 22, being mounted on a shaft 23, to which motion is imparted through any convenient source of power. In order that some of the ground pulp may not ooze into the bottom of the section B of the housing, and into the tray 24, provided in said bottom section, the periphery 25, of said cone is arranged to operate in a recess 26, formed in the housing 12. Thus, while water may escape from the cone into the tray, the ground material cannot, but is centrifugally discharged through the opening 19. The water is drained from the tray 24, by a pipe 27, which is connected to the outlet 28, in the tray, and which leads to the settling and collecting tank 11.

The fatty constituents of garbage, and the minute particles of animal and vegetal matter, which may be termed "sludge" or "tankage", are carried to the settling tank 11, where they are recovered for subsequent uses. This tank consists of a receptacle provided with a hinged lid 29, onto which is fastened a vent pipe 30, to carry off what odors may arise from the liquids therein deposited. When the water rises in said tank 11, above the goose-neck 31, of an outlet pipe 32, it flows off through the trap 33, in said pipe, while the globules of grease, remain on the surface of the water, from which it is separated or skimmed. The loose, soft sediment of the liquid, which collects at the bottom of the tank, is removed through a door 34, after the supernatant waters have been let out through the discharge pipe 35, and this sediment is then used either in its natural condition or prepared for fertilizer.

When the vat 1, has been charged with the waste material, the valve 2', on the inlet thereto, and the gate valve 9, in the casing, are closed, while the valve 10', on the drain pipes 10, are opened to allow the water from the garbage to flow off. When this is done, the valve 6', on the main steam supply pipe 6, is opened. In this vat, therefore, the steam jets, issuing from the perforated pipes 4, produce a pressure on and keep the material in a state of violent agitation, causing all of the waste to be thoroughly infused with the steam, and at the same time macerating it and destroying all decomposing animal life, without, however, cooking or digesting it, and thereby causing the essential juices and salts to be dissipated or extracted.

When the mass has been subjected to pressure and heat for a length of time sufficient to sterilize and purify the material, the valve 10', on the drain pipes 10, is opened, and the waters of condensation together with melted greases, fats and oils, and whatever else may be in fluid form, drained off and delivered to the settling tank 11, for subsequent recovery and use. Thereupon the gate valve 9, is opened and the macerated mass allowed to gravitate though the passage way of the valve-casing 8, eventually striking the apex of the cone 14, which is being revolved at a high speed. The softened portions of the priorly treated mass, are readily reduced to a pulpous condition by the centrifugal force of the cone, and such waste as bones, gristle, and other hard materials found in garbage, are ground to a size slightly smaller than the outlet from the housing 12, through which all of the waste is discharged. At this point the treated mass is ready for food, and may be delivered directly from the nozzle 36, into receptacles, which are then hermetically sealed.

What I claim, is:—

1. An apparatus for converting waste products into food, comprising a vat in which the products are adapted to be sealed, means to supply steam in jets to said vat to subject the products to pressure and agitation, a housing to receive the material from said vat, and means in said housing to grind the mass and centrifugally discharge it therefrom.

2. An apparatus for converting waste products into a homogeneous food, comprising a vat in which the waste products are adapted to be sealed, means to supply steam in jets to said vat to subject the mass to pressure and agitation, and macerate the same, a housing to receive the material from said vat, and a cone in said housing provided with means to grind the mass and centrifugally expel the same from the housing.

3. An apparatus for converting waste products into a homogeneous food, comprising a vat into which the waste products are adapted to be deposited, a plurality of perforated pipes in said vat to deliver steam in jets in said vat and subject the products to pressure, agitate and macerate the same, a valved housing to receive the material from said vat, said housing having a constricted outlet, a cone in said housing provided with means to grind and expel the products from said housing, and a fluid receiving tray in said housing.

4. An apparatus for converting waste products into food, comprising a vat in which the products are adapted to be sealed, a plurality of perforated pipes within said vat to deliver steam therein and macerate the products while under pressure, and in agitation, a housing, a casing between said vat and said housing, a conical member in said housing provided with means to grind and centrifugally expel the products from said housing, a fluid receiving tray in said housing, and a drain pipe attached to said tray.

5. An apparatus for converting waste products into food, comprising a vat having a valve controlled inlet and a valve controlled outlet, said valves serving to seal the products in said vat, means to supply steam in jets to said vat to agitate and macerate the products, a housing to receive the products from said vat, said housing being provided with acuminate ribs and a fluid receiving tray, a cone revoluble in said housing and provided with vanes arranged to coöperate with the acuminate ribs of said housing in reducing the products to a pulpous condition and expelling the ground material from said housing, and means to collect the fluids exuding from the products.

6. An apparatus for converting waste products into food, and recovering the oils and sludge, comprising a vat in which the products are adapted to be sealed, a casing connected with said vat, a valve in said casing and a valve on said vat, both said valves serving to seal the vat, a plurality of perforated pipes in said vat to deliver steam in jets thereto and agitate and macerate the products, a settling and collecting tank, valved pipes connected with said casing and said vat to drain the fluid constituents into said tank, a housing below said casing to receive the products from said vat, said housing having acuminate ribs and a constricted outlet on one side, a cone revoluble in said housing and provided with vanes, arranged to coöperate with the ribs in said housing to reduce the products to a pulpous condition and centrifugally expel the same from the housing, a fluid-receiving tray in said housing, and a drain pipe connected with said tray and said settling tank.

In testimony whereof I have set my hand in the presence of two witnesses.

EDWARD C. EMERY.

Witnesses.
CATHERINE M. BURKE,
ANTON GLOETZNER, Jr.